(12) United States Patent
Deland

(10) Patent No.: US 6,267,453 B1
(45) Date of Patent: Jul. 31, 2001

(54) ENDLESS TRACK WITH DEBRIS EVACUATION SIDE OUTLETS

(75) Inventor: André Deland, Drummondville (CA)

(73) Assignee: Soucy International Inc. (CA)

( * ) Notice: Subject to any disclaimer, the term of this patent is extended or adjusted under 35 U.S.C. 154(b) by 0 days.

(21) Appl. No.: 09/432,577

(22) Filed: Nov. 12, 1999

(51) Int. Cl.⁷ .............................. B60B 23/00; B60B 23/06
(52) U.S. Cl. ............................................ 301/113; 301/114
(58) Field of Search ..................................... 305/100, 101, 305/111, 112, 113, 114, 151, 165, 193

(56) References Cited

U.S. PATENT DOCUMENTS

| | | | |
|---|---|---|---|
| 1,305,280 | * 6/1919 | Gross | 305/193 |
| 2,273,950 | * 2/1942 | Galanot et al. | 305/193 |
| 2,887,343 | * 5/1959 | West | 305/165 |
| 2,917,095 | * 12/1959 | Galanot | 305/193 |
| 3,387,897 | * 6/1968 | Reid | 305/193 |
| 5,284,387 | * 2/1994 | Loegering | 305/193 |
| 5,429,429 | * 7/1995 | Loegering et al. | 305/193 |

FOREIGN PATENT DOCUMENTS

| | | | |
|---|---|---|---|
| 655610 | * 1/1938 | (DE) | 305/193 |
| 978050 | * 4/1951 | (FR) | 305/193 |

* cited by examiner

*Primary Examiner*—S. Joseph Morano
*Assistant Examiner*—Long Bao Nguyen
(74) *Attorney, Agent, or Firm*—Bourque & Associates, P.A.

(57) ABSTRACT

A self-cleaning flexible track for use with vehicles suitable for travel over rough terrain, the track being adapted to be entrained by a drive wheel disposed on the vehicle, the track having opposed first and second lateral sides, an inward surface and an outward surface, track having a plurality of spaced apart paddles projecting from the interior surface adjacent each of the first and second lateral sides, the paddles have a body portion and a pedestal wherein the body portion is much wider than the pedestal, wherein the body portion and the pedestal of each of the paddles are configured and disposed to form an outlet therebetween, the outlet allowing the interior volume of the track and the exterior of the track to be in constant communication with each other.

11 Claims, 12 Drawing Sheets

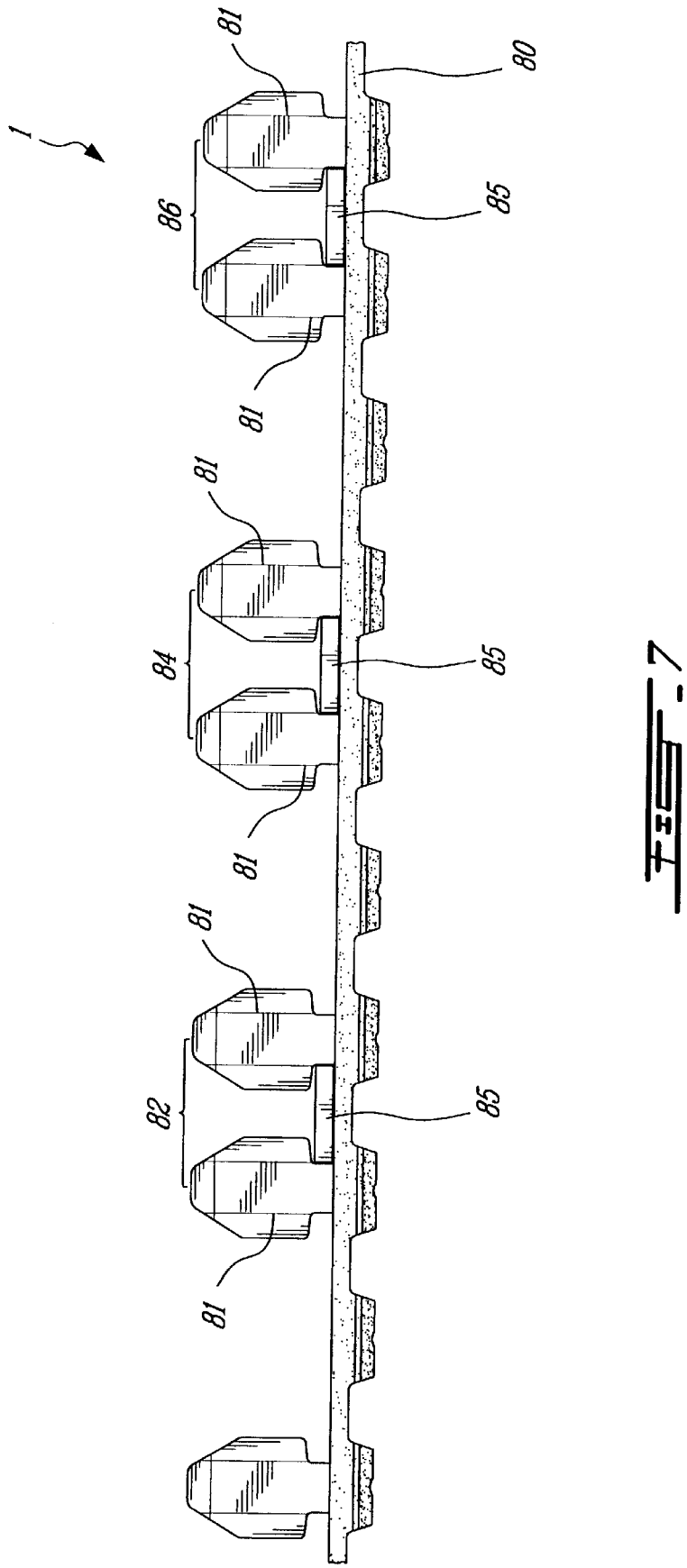

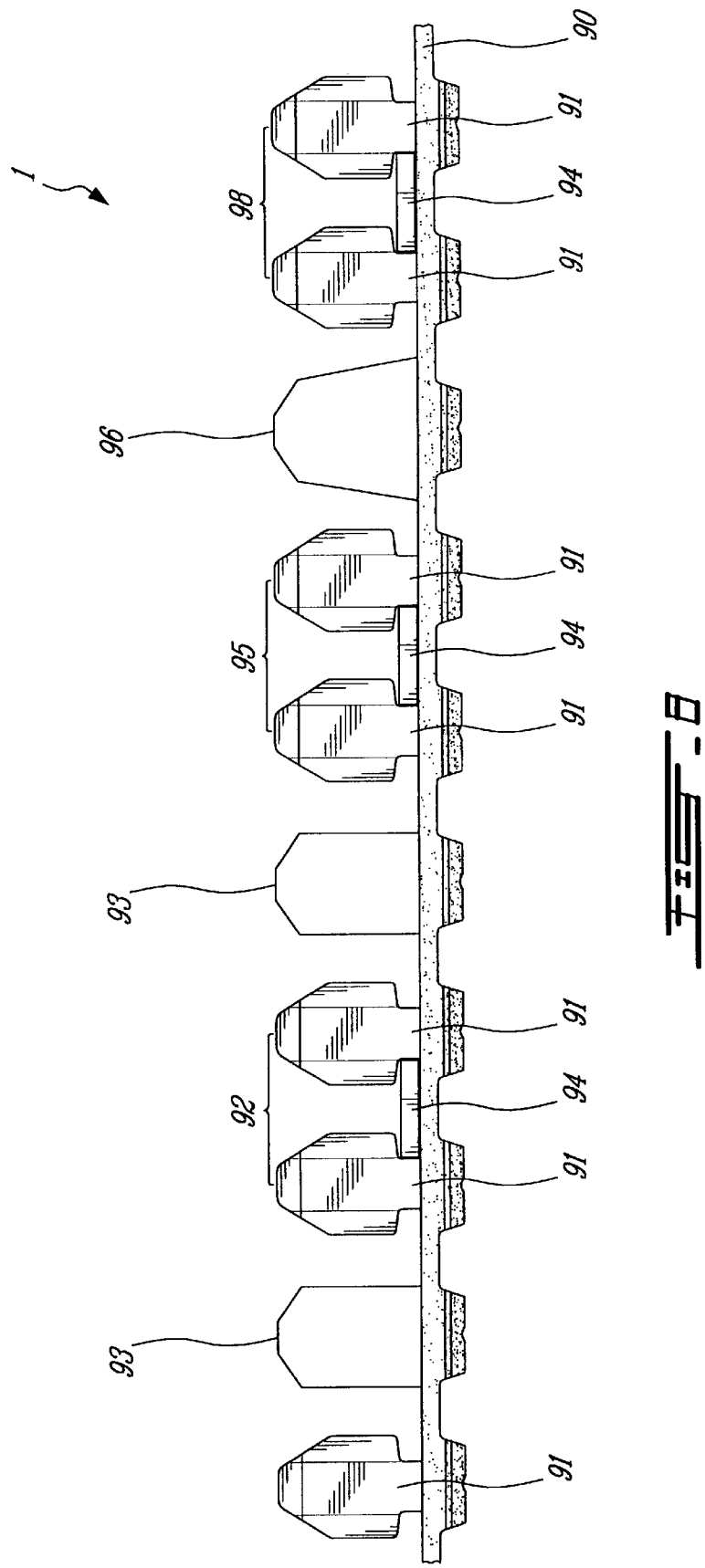

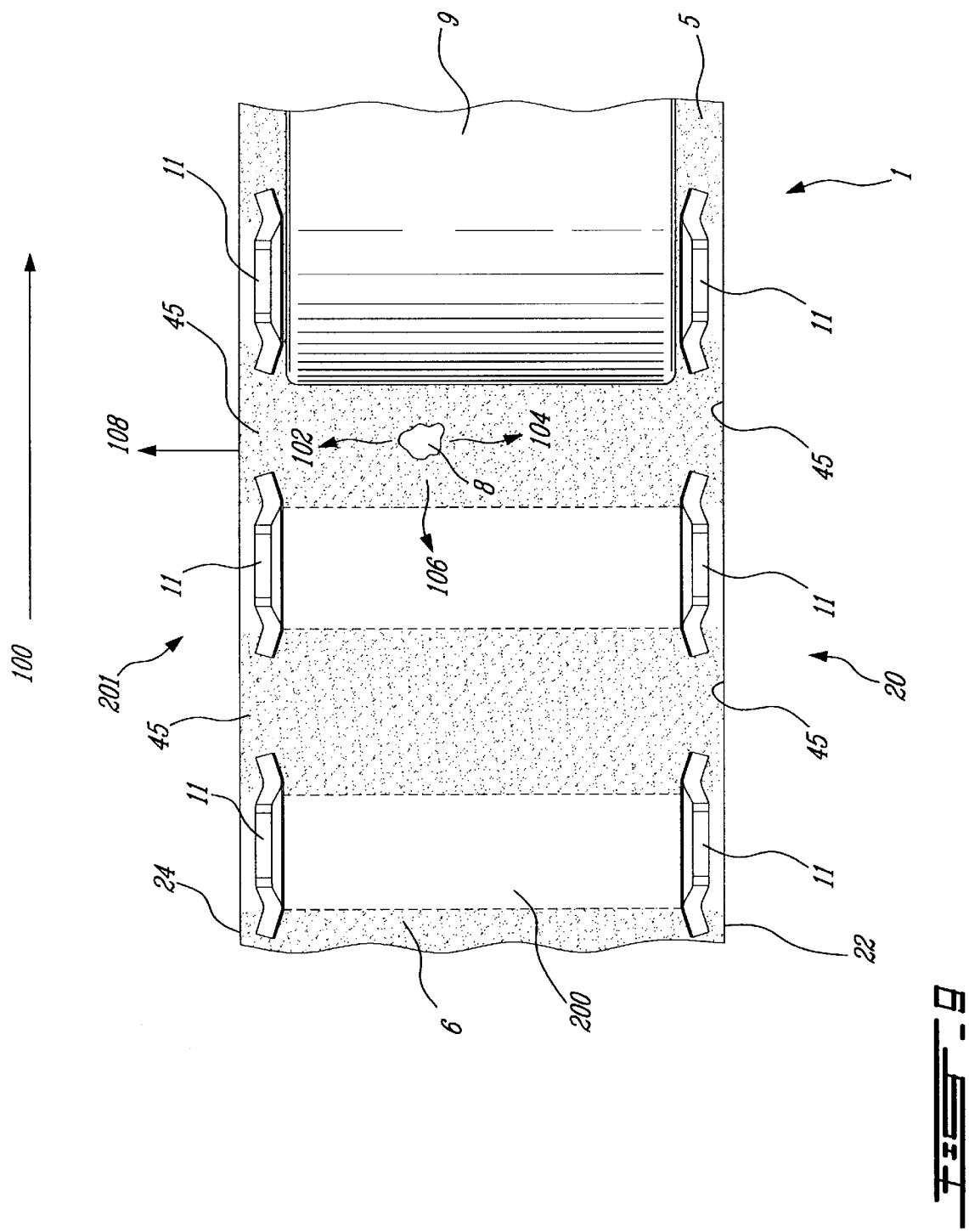

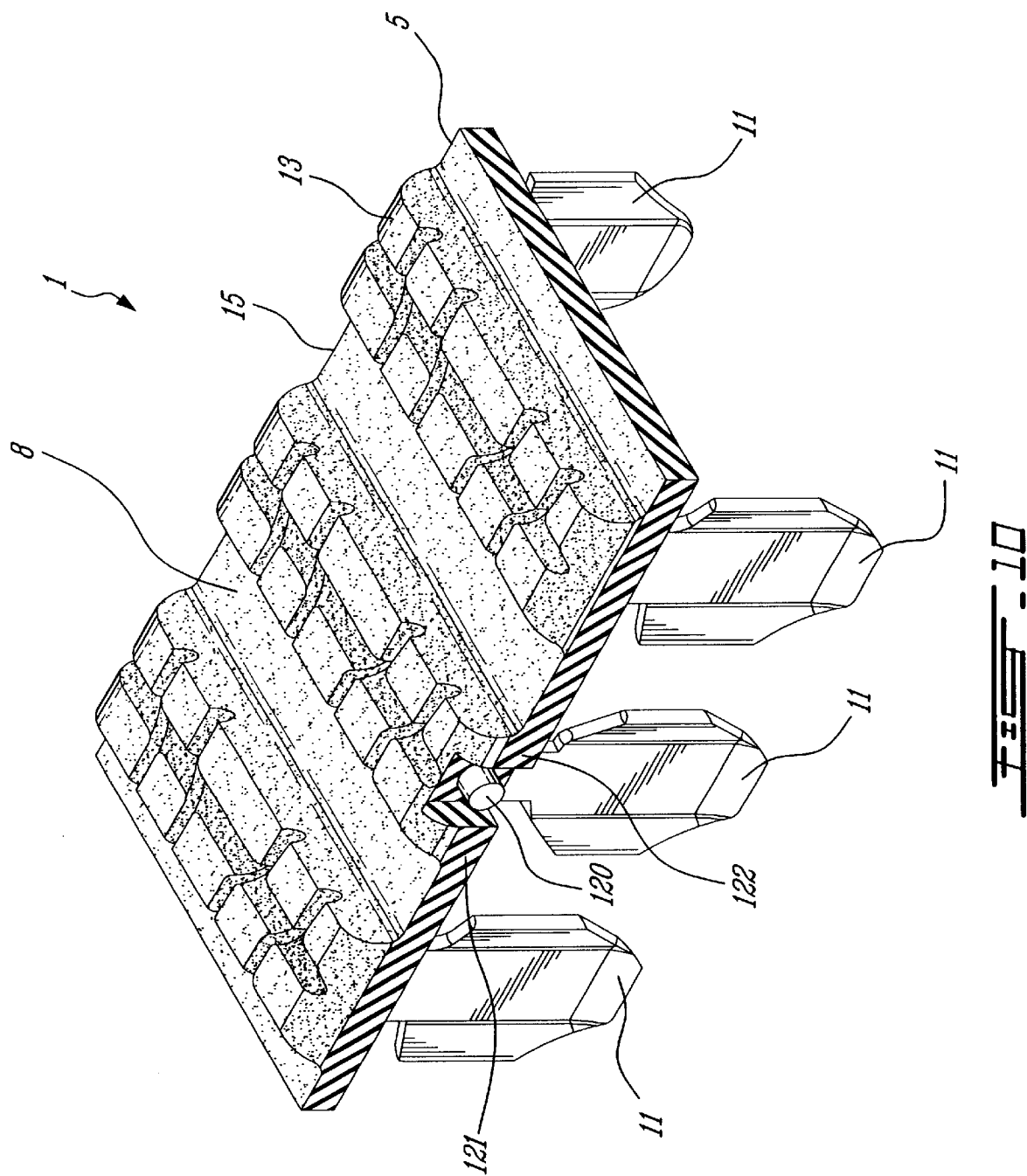

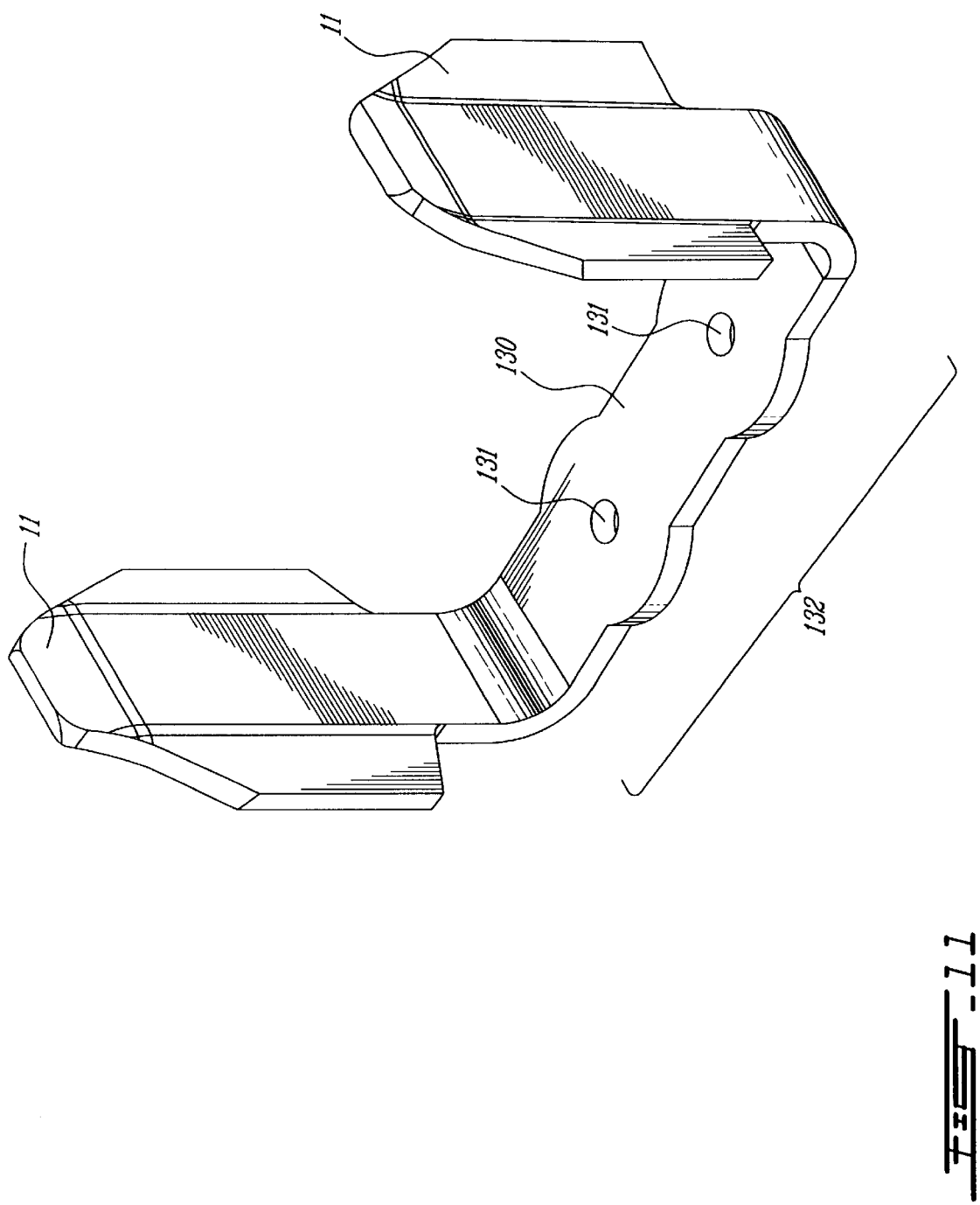

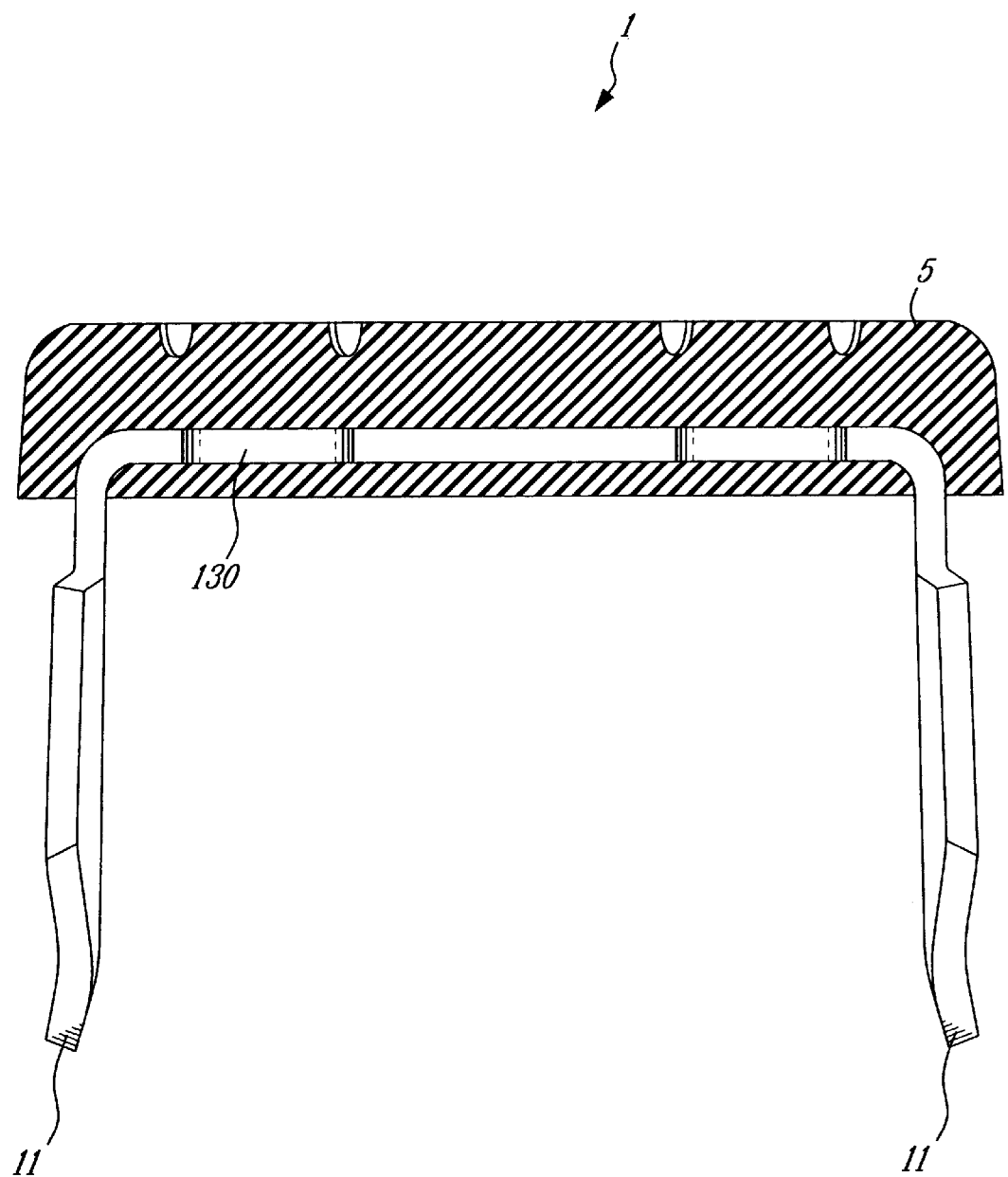

ENDLESS TRACK WITH DEBRIS EVACUATION SIDE OUTLETS

BACKGROUND OF THE INVENTION

The present invention relates to endless tracks to be used with tracked vehicles. In particular, the invention relates to improved endless tracks to be used with tracked vehicle wherein said track comprises evacuation means for allowing accumulated debris to be expelled from said track.

Tracked vehicles are well known and have been in existence for a number of years. Tracked vehicles are, for example, in use in a variety of fields, whether as earth moving equipment, such as bulldozers, mechanical excavators, etc., farming equipment, military equipment, or vehicles used in any number of specialized fields, such as for fighting fires, for bomb disposal, remote manipulation, etc. Tracked vehicle may also be used as snow cleaning equipment, or as ski hill grooming equipment.

The used of tracked vehicles, in particular, the use of tracked vehicles on hard or rocky ground comprises the disadvantage that the tracks may, sooner or later, become clogged or filled up with debris such as stones, rocks, branches, earth, etc. This debris may, through time, cause the tracks to become jammed and the vehicle to stop. Further, even if a vehicle is not brought to a standstill by debris, its efficiency may be reduced, resulting in an increase in power consumption and a reduction of the speed or pulling power of the vehicle. Finally, the accumulation of rocks, debris, etc. may cause premature wear and tear of the track and its constituent parts, and may eventually cause the premature breakdown of the tracked vehicle, or the track itself, the wheels, gears, suspension mechanisms and other mechanisms commonly used with such tracked vehicles. The accumulation of debris may therefore increase maintenance and replacement costs of known tracked vehicles.

Tracks and tracked vehicles are well known in the art, as exemplified by U.S. Pat. No. 5,363,936 to Grawey et al., U.S. Pat. No. 2,385,758 to Hansen, U.S. Pat. No. 1,808,446 to Armington, U.S. Pat. No. 1,924,161 to Knox, U.S. Pat. No. 1,901,421 to Streich, U.S. Pat. No. 2,167,039 to Ekbom, U.S. Pat. No. 3,378,314 to Knowles, and U.S. Pat. No. 2,314,355 to Knox. The prior art discloses tracks which, without being the object of the patent, are provided with holes and openings which may, in a haphazard manner, allow for the exit therethrough of debris, snow etc. such for as example Hansen, wherein an open center snow track is disclosed. However this open ended snow track may allow as much or more debris and snow to be introduced into the track, as may be evacuated, and further lacks the lateral rigidity and sturdiness and necessary for heavy duty use. Further Streich discloses links which include curved portions which serve to physically push and clear the track of dirt, however such curved portions are disposed on the outside of the track, and therefore serve the purpose of clearing any dirt or accumulated debris which may be found on the outside of the track, and is of no use to clear the debris which may find its way inside the track, i.e. between the wheels. Also, Ekbom provides for an offset or staggered arrangements of driving lugs, however the arrangement of the lugs is such that the space between adjacent lugs becomes constricted as the track is wound-about the end wheels of the vehicle, therefore restricting the manner in which dirt and/or debris can be evacuated.

Further, each of the above disclosed prior art comprise cleat members or lugs which keep the track aligned with the wheels, and which cleat members are shaped and configured such that the space between adjacent cleat members are widest at the point where they come into contact with the track, and then they become narrower the further away they are from the track. As may be seen, the broadest or widest aspect of the cleat is therefore disposed immediately adjacent the track, and the narrowest part of the cleat is disposed away from the track. The effect of this arrangement or geometry is to cause any opening which may be present between adjacent cleats to be narrowed or closed off as the track is wound about the end or traction wheels. Thus, the prior art discloses tracks and track arrangements wherein the opening between adjacent cleats are constricted or closed off, precisely at the point where debris may, through the force of gravity, be looking for an exit from the track, namely when the tracks go around the end wheels. Thus, the configuration and disposition of the cleats in the prior art hamper, or even preclude the evacuation of debris from the track.

Further, the above cited prior art do not actually provide for an opening, or tunnel or evacuation means which may allow the evacuation or expelling of accumulated debris found therein, at all times, and in all positions of the track.

It would be therefore advantageous to provide for a track configured and disposed such that evacuation means are provided which would allow for the expelling at all times of dirt and/or debris which may have accumulated in the tracks.

It would be further advantageous to provide for a track comprising paddles which are configured and disposed such that an opening is disposed between adjacent paddles, such that the cross-sectional area of this opening may remain substantially constant as the track moves about the driving wheels.

It would be further advantageous to provide for a track comprising paddles whose geometry is such that even when the paddle come closer in contact with one another, an evacuation opening, i.e. tunnel, or evacuation means, adjacent the track remains open and of substantially constant cross-sectional area at all times.

It would be further advantageous to provide for a track comprising paddles whose geometry make it such that the track is a self-cleaning track.

SUMMARY OF THE INVENTION

Thus in accordance with present invention there is provided for a:

self cleaning track suitable for use with a vehicle adapted for travel over rough terrain, said track being configured and disposed to be entrained by a drive wheel disposed on said vehicle, said track comprising:
opposed first and second lateral sides, an inward surface and an outward surface and at least one pair of spaced apart paddles projecting from said track adjacent said first lateral side, each of said paddles comprising a body portion and a pedestal, said pedestal connecting said body portion to said track, said body portion being wider than said pedestal,
said pair of spaced apart paddles defining a boundary between an interior volume of said track and the exterior of said track
wherein said body portion and said pedestal of each of said paddle are configured and disposed to form an outlet therebetween, said outlet allowing the interior volume of said track and the exterior of said track to be in constant communication with each other at all times,
wherein said body portion and said pedestal of each of said paddle being further configured and disposed such that when said track is entrained by said drive wheel such that said spaced apart paddles are rotated towards each other, the cross sectional area of said outlet remains substantially constant.

Further, in accordance with an additional aspect of the present invention, there is provided for a:

self-cleaning flexible track for use with vehicles suitable for travel over rough terrain, said track being configured and disposed to be entrained by a drive wheel disposed on said vehicle, said track comprising opposed first and second lateral sides, an inward surface and an outward surface, said track comprising a plurality of spaced apart paddles projecting from said interior surface adjacent each of said first and second lateral sides, each of said paddles comprising a body portion and a pedestal, said pedestal connecting said body portion to said track, said body portion being wider than said pedestal, said plurality of spaced apart paddles defining a boundary between an interior volume of said track and the exterior of said track wherein said body portion and said pedestal of each of said paddles are configured and disposed to form an outlet therebetween, said outlet allowing said interior volume of said track and the exterior of said track to be in constant communication with each other, wherein said body portion and said pedestal of each of said paddles being further configured and disposed such that when said track is entrained by said drive wheel such that adjacent paddles are rotated towards each other, the cross sectional area of said outlet remains substantially constant.

The endless track in accordance with the present invention may be constructed with any number of materials or with a plurality of different materials. In accordance with a particular embodiment, the endless track may be made of rubber, i.e. synthetic or natural rubber, which may be of a particular composition suitable for use with tracked vehicles. In accordance with a further particular embodiment of the present invention, the endless track may be a relatively narrow and elongated track, which may be most suitable for small motorized track vehicles i.e. such as remote manipulation robots which may often be used by police forces, for bomb disposal, or for other such activities. In accordance with this embodiment, such endless tracks may be configured and designed so that they do not necessarily have to withstand very large dynamic loads, i.e. high speed loads. Further, such small endless tracks may also not have to carry i.e. withstand, heavy weights. Thus in accordance with an application of the present invention, the endless track may be constructed with a plurality of links, or elements, (i.e. rubber or synthetic or composite material links), which links may be linked one to another through pins, or any other known linking means. Alternatively, the endless track in accordance with the present invention may comprise a single elongated piece, i.e. single, unitary elongated piece of rubber having opposed first and second ends, which first end may be connected to the second opposed end through, for example a pin, therefore forming an endless loop. For example, in accordance with a particular embodiment, the endless track may be of a unitary construction, i.e. may comprise one single elongated piece of rubber, being 5.8 inches wide and 128.65 inches long when tensioned at 300 pounds.

However, it is understood that the track of the present invention may also be of a more conventional track design, and be constructed of a plurality metal links which are pinned together in any well known manner. Thus in accordance with this embodiment, the multi link metal track may be of a more sturdy construction, and be more suitable for heavy duty work such as construction work, farming work and/or adapted for military uses.

In any event, the paddles in accordance with the present invention may be affixed or embedded in the links, or conversely, if the track is a unitary i.e. one piece track, be embedded directly in the tread of the track itself. The paddles may be of a single paddle design, meaning that they may be embedded individually, into the tread of the track, or alternatively, paddles may be of a double design, meaning that the double paddle units may have one paddle that extends from one lateral side edge of the track and the second paddle may extend from the opposed lateral side edge of the track. As may be understood, paddles may be constructed of any known material, such as for example aluminum, steel, stainless steel, or a composite material, and may be fabricated by any known mean. For example, in accordance with a particular embodiment, a double paddle unit may be constructed from a single stamped piece of(stainless) steel which may then be bent twice along its length at 90 degrees such that the body is embedded into the tread of the track and two paddles extend from the track. Further, the paddles may alternatively be laser cut from sheets of steel.

The exterior of the track may comprise a pattern and/or grooves which may facilitate the gripping of the track into soft earth, or up inclines or embankments. Alternatively, the inside of the track, i.e. the side of the track which may be in contact with the wheels of the track vehicle may also comprise a number of projecting elements, i.e. for example disposed transversely to the direction of travel of the track, in order to increase the traction between the wheels of the track vehicle and the track itself, i.e. in order to avoid slippage between the track and the wheels.

In accordance with a particular embodiment, the track of the present invention may comprise one single elongated track which may be molded in one piece with the paddles projecting therefrom. In accordance with this embodiment, the rubber may be vulcanized as a result of the fabrication process, and may comprise a number of different components such as reinforcement tire cord and other processes and components common to the tire manufacturing field.

BRIEF DESCRIPTION OF THE DRAWINGS

FIG. 7 is an alternative embodiment of the track of FIG. 1;

FIG. 8 is a further alternative embodiment of the track of FIG. 1;

FIG. 9 is a top elevation view of FIG. 4 along view lines 9—9 of FIG. 4;

FIG. 10 is a perspective view of track 1 of FIG. 1;

FIG. 11 is a perspective view of a double paddles 11 show outside of the track;

FIG. 12 is a sectional view along view lines 12—12 of FIG. 10;

DETAILED DESCRIPTION OF THE DRAWINGS

Figure 1:
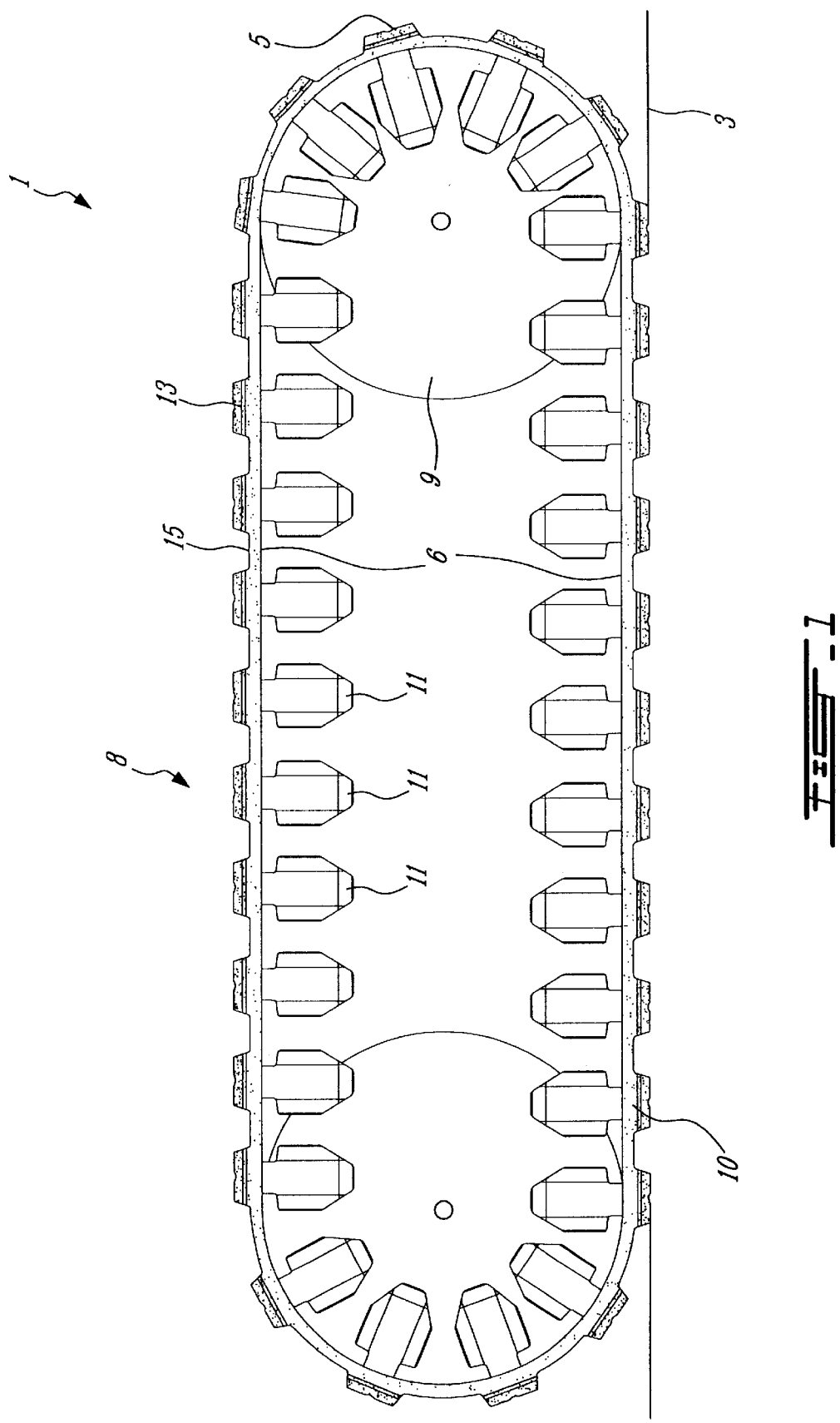
FIG. 1 is a side elevation view of an endless track in accordance with the present invention which track is spaced apart on a pair of longitudinally separated wheels structures.

Referring to FIG. 1, there is illustrated a side elevation view of an endless track generally designated by the reference number 1. Although not shown, the (endless) track 1 illustrated in FIG. 1 may be used in conjunction with a vehicle suitably adapted for use over rough or uneven terrain 3. As illustrated, the endless track 1 comprises a tread 5 comprising a series of alternating projections 13 and depressions 15 disposed along the length of the track, which projections 13 and depressions 15 may act to facilitate the gripping of the track into ground 3. Further, tread 5 is illustrated as being wrapped around a pair of longitudinally separated wheel structures 7 and 9 which wheel structures 7 and 9 may be disposed on the vehicle (not shown) through any well known means. Although FIG. 1 illustrates the endless track 1 as being wrapped around only two wheels structures 7 and 9, it is understood that endless track 1 may alternatively be wrapped around more than two wheels structures, and may in addition comprise any number of intermediate wheels or other components disposed between wheels structures 7 and 9, such as, for example suspension mechanisms, tread tensioning mechanisms and any other required or desired mechanical devices necessary to effect the motion of the track 1. Although illustrated as having an upper run 8 and a lower run 10 which are of substantially equal length and substantially parallel one to another, it is further understood that track 1 may be configured and disposed such that upper run 8 and lower run 10 may not be equal, nor may they be parallel to each other. As may be understood, wheels structures 7 and 9 may each or both be a driving wheel structure such that they may be imparted with rotational force from one or more driving means, such as a motor, which may then be transferred to track 1 such that tread 5 is advanced through the gripping action of tread 5 with ground 3.

Track 1 in addition to comprising tread 5 further comprises a series of paddles 11 projecting inwardly from inside surface 6 of tread 5. As illustrated, "projecting inwardly" is understood to mean projecting towards the center of the track as opposed to projecting outwardly from the track. As may be seen, paddles 11 may be disposed substantially at regular intervals along the length of tread 5, and therefore may completely cover the inside area of tread 5. As may be understood, paddles 11 may have as a function to keep track 5 aligned about wheel structures 7 and 9, such that, through the rotation thereof, tread 5 may not fall off wheel structures 7 and 9. Paddles 11 may, in part, provide lateral stability for tread 5 on wheel structures 7 and 9. The particular embodiment of FIG. 1 discloses paddles I 1 which may be substantially identical one to another, and which are equally spaced apart one from the other. However, as may be understood, in accordance with further embodiments of the present invention, paddles 11 may have different shapes and configurations. However as may also be understood, in order to effect the evacuation of debris in at least one location along the track, it may be necessary to provide at least two paddles 11 which may be configured and disposed substantially as those shown in FIG. 1.

As may be understood from FIG. 1, tread 5 may comprise a plurality of longitudinally spaced paddles 11 disposed adjacent one lateral edge 22 of tread 5, (as further illustrated in FIG. 9) and may further comprise a second series of longitudinally spaced paddles 11 disposed adjacent the opposed i.e. second lateral edge 24 of tread 5. As may be understood, the series of paddles disposed along the first lateral edge 22 of tread 5 and the series of paddles disposed on the opposed i.e. second lateral edge 24 of tread 5 may be aligned with each other such that the opposed paddles 11 may not be visible from the side elevation view of FIG. 1. However in accordance with an alternate of embodiment, the paddles 11 disposed along the first lateral edge 22 of tread 5 may be staggered from, i.e. not aligned with, the paddles 11 disposed along the second lateral edge 24 of tread 5. As may be understood, depending on the width of tread 5, and on the width of the wheel structures 7 and 9 (and of any other wheels), paddles 11 may be disposed close to or at the outermost point of lateral edges 22 and 24 of tread 5, or may, alternatively be disposed away from the outermost point of lateral edges 22 and 24 of tread 5.

Figure 2:
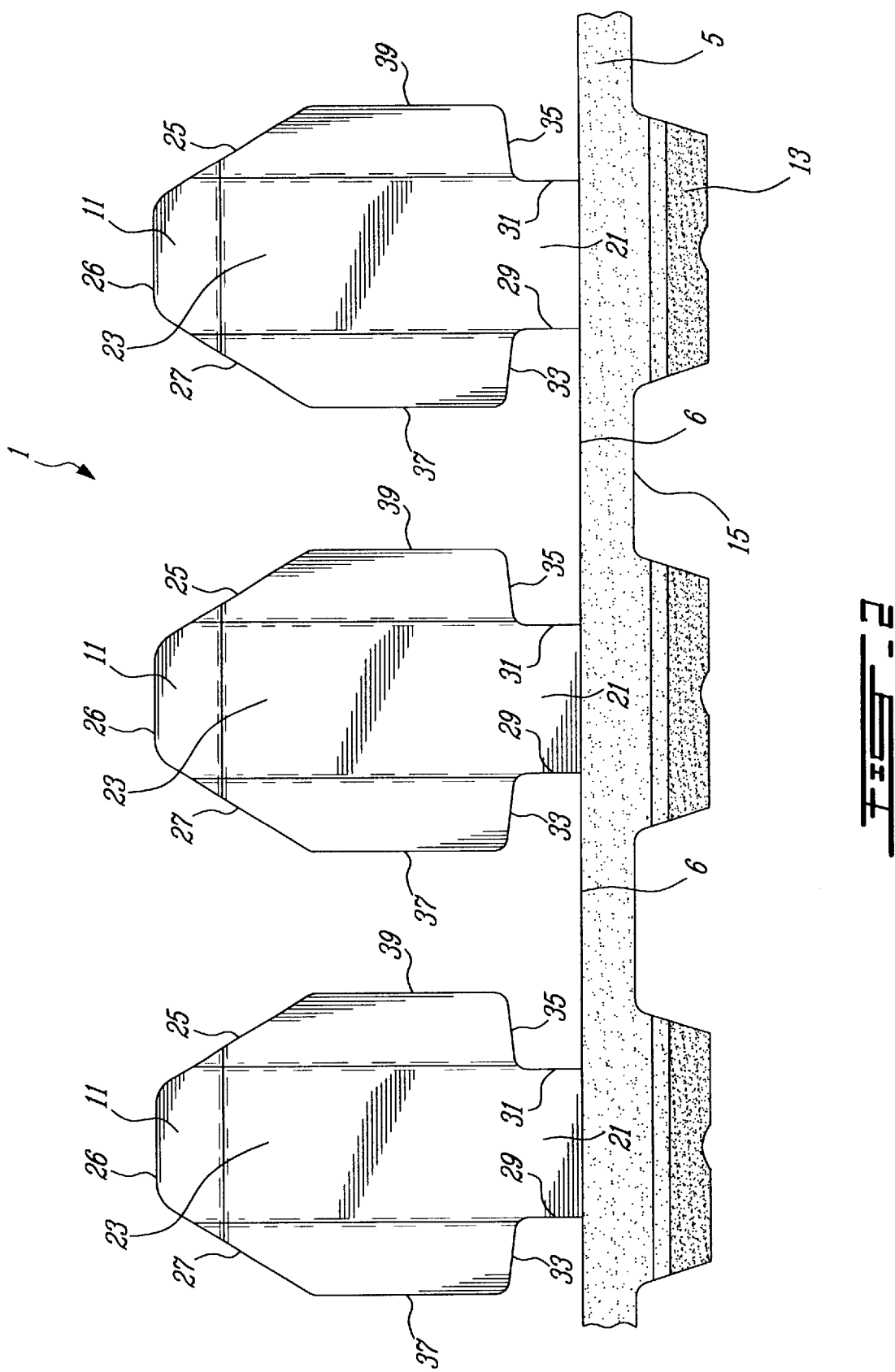
FIG. 2 is a close up view of a particular embodiment of the track shown in FIG. 1.
Figure 3:
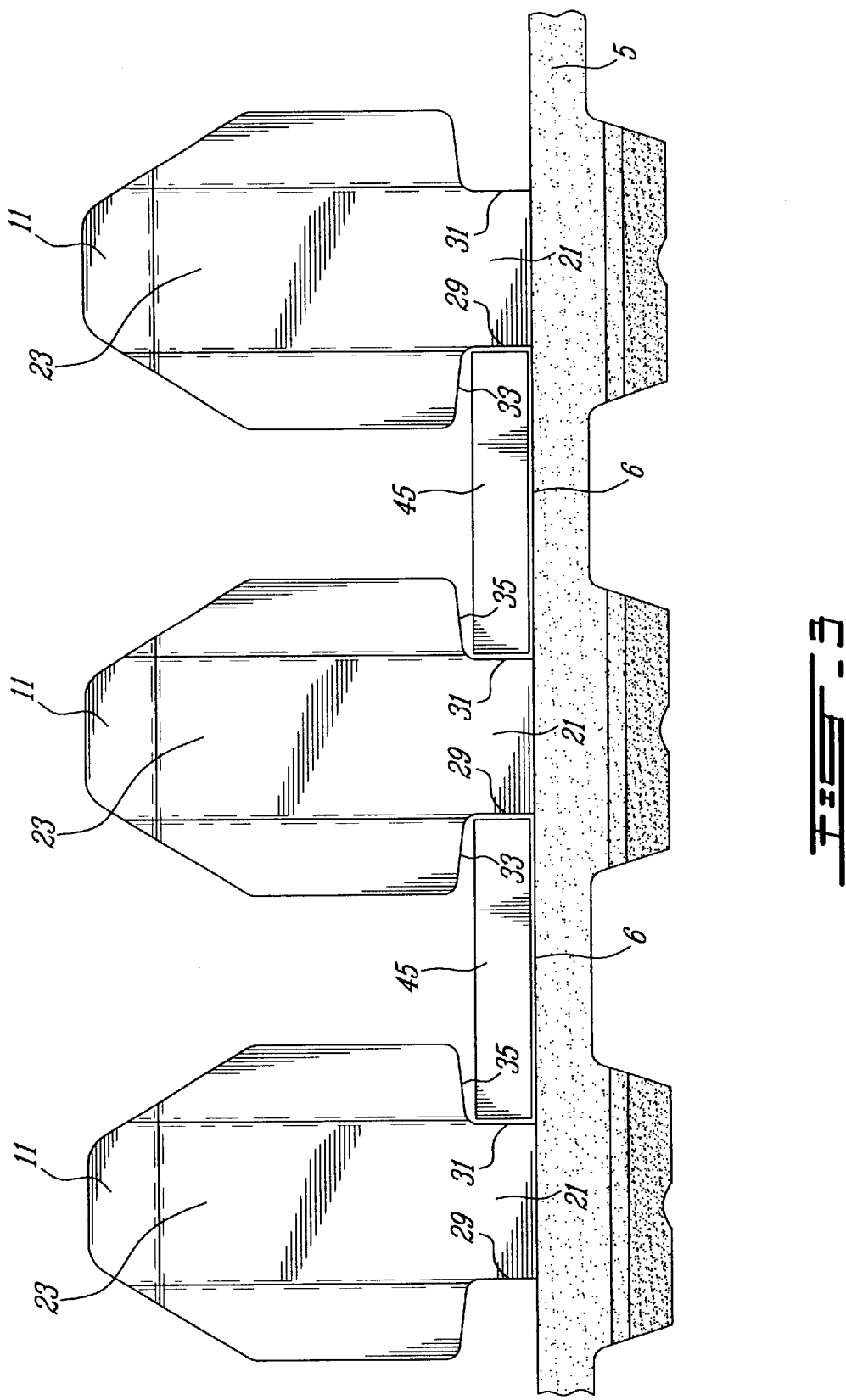
FIG. 3 is a further close up view of the track of FIG. 1.

FIGS. 2 and 3 illustrate a close up of the endless track 1 of FIG. 1. In particular, FIG. 2 illustrates a particular embodiment, i.e. a particular shape of paddles 11 disposed along a lateral edge 22 of tread 5. As illustrated, each of the paddles 11 of FIG. 2 may be configured and disposed to be identical (i.e. substantially identical) to each other, although it is understood that the configuration of the paddles 11 disposed projecting from tread 5 may differ one from the other. For example, there may be a recurring pattern of different configurations, or the different configurations of paddles may be randomly disposed.

As may be seen from FIG. 2, paddles 11 may comprise a body 23 and a pedestal 21 which may connect body 23 to tread 5, i.e. to surface 6 of tread 5. As illustrated in FIG. 2, pedestal 21 and body 23 may be unitary and therefore form a seamless whole, or alternatively, the pedestal 21 and body 23 may comprise separate and distinct components to be affixed to each other through any known means. Pedestal 21 may comprise opposed lateral ledges 29 and 31 while body 23 may comprise bottom edges 33 and 35, lateral side edges 37 and 39, and upper edges 25, 26 and 27.

Figure 4:
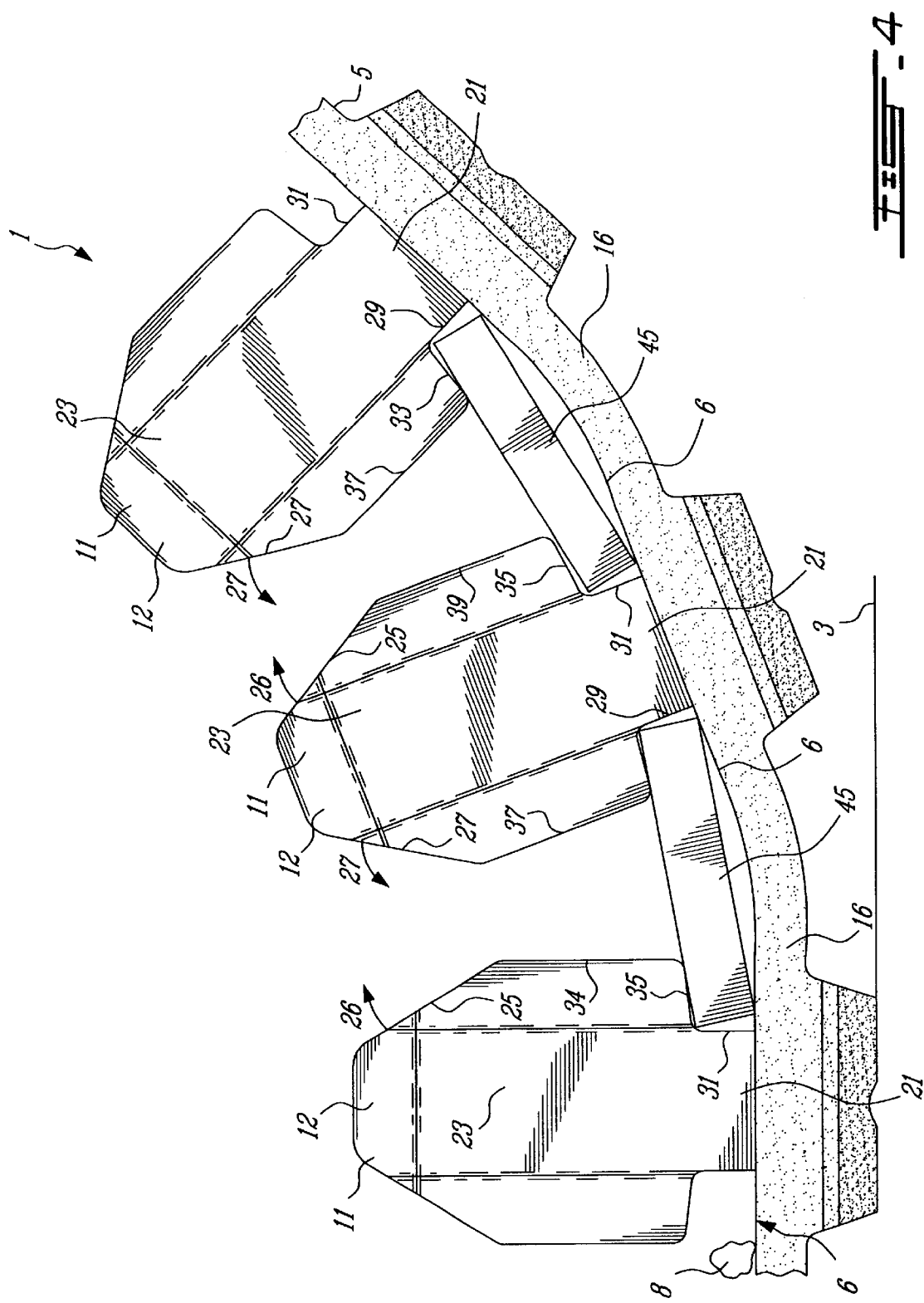
FIG. 4 is a close up view of the track of FIG. 1 shown being rotated about a wheel structure.

As may further be seen from FIG. 2, paddles 11 may be configured and disposed such that the body 23 and the pedestal 21 are different in size, namely that pedestal 21 is narrower (i.e. for example much narrower) than body 23. For example, pedestal 21 may be only 50% of the width of body 23, or even less than 50% of the width of the body 23. Although the exact difference in the width of the pedestal 21 and of the body 23 may not be important, it is understood that the relative sizes of pedestal 21 and of body 23 are to be such that a path means 45, i.e. an outlet or side outlets may be formed between adjacent paddles 11. Further, lateral edges 29 and 31 of pedestal 21, and bottom surfaces 33 and 35 of body 23 may be configured and disposed such that there may be formed between a paddle 11 and an immediately adjacent paddle 11, a path means as illustrated by box 45 of FIG. 3. As may be understood, path means 45 may act as an opening disposed between adjacent paddles 11 which may, for all practical purposes, remain substantially of constant cross-sectional area regardless of the configuration of paddles 11. For example, even when paddles 11 are made to be oriented in a different angle, i.e. as shown in FIG. 4 wherein tread 5 is brought around wheel structures 7 and 9, path means 45 may remain substantially of constant cross sectional area. Thus, path means 45 may therefore provide for a opening, or tunnel, or communication path such that the interior of the track, i.e. the area disposed intennediate paddles 11 adjacent edge 22 and adjacent edge 24, and the exterior of a track are in communication with each other at all times. Thus as may be understood, path means 45 may be configured and disposed such that at all times, irrespective of the orientation of paddles 11, a minimum cross sectional area is provided such that the interior of the track is in communication with the exterior of the track, thus allowing for the expulsion or evacuation of debris therethrough.

As further illustrated from FIG. 4, there is shown a close up of the endless track 1 as tread 5 is made to be wrapped around wheel structure 9 (not shown for clarity). As may be understood, as tread 5 is made to be entrained by the wheels of the vehicle, namely wheel structure 7 and 9 as illustrated in FIG. 1, the tread 5 may be made to be advanced in an endless loop, thus imparting force from the wheels means 7 and 9 to the ground 3 and causing the vehicle to advance either forwardly or rearwardly as the case may be. As tread 5 is brought around the endmost wheel structure 9 (or alternatively, wheel structure 7), the tread 5 may naturally take the form of the wheel structures 7 and 9, and be caused to be shaped around the wheel to begin its travel in the opposed direction.

As may be understood, the track may therefore change shape, i.e. for example, bend about either its weakest points, as illustrated by reference number 16 or about a pined hinge (as shown in the prior art) or any other point as the case may be. The wrapping around action of tread 5 about wheel 9 may cause the change in the orientation of paddles 11 as illustrated in FIG. 4. More particularly, paddles 11 may begin to rotate towards each other in the direction of motion arrows 26 and 27 thus creating a relative movement of adjacent paddles 11 towards each other. As may be understood, the geometry of the paddles 11 and tread 5 may cause the distal end 12 of each paddle 11 to be displaced closer to each other, therefore causing surfaces 25 and 39 of a paddle 11 to come closer to surfaces 27 and 37 of the immediately adjacent paddle 11. Therefore, the space between the distal end 12 and of each paddle 11 designated by arrow 32 may, due to the relative movement of each paddle 11 towards each other, be caused to be restricted i.e. reduced in size. Depending on the configuration and geometry of the paddles 11 and of the track 5 itself, it may be apparent that opening 32 may, for example, be closed off almost completely, or all together. Thus, any capacity that opening 32 may have had to allow debris to be evacuated therethrough may now be either severely restricted, or blocked off completely.

However, in accordance with the present invention, due to the configuration and disposition of paddles 11 as shown if FIGS. 2 to 4, namely, in that body 23 is much wider than pedestal 21, the path means represented by box 45 may remain generally of constant cross sectional area even when the relative motion of paddles 11 towards each other is effected, and space 32 is therefore constricted, or even closed off. Thus, any debris (i.e. earth, rocks, twigs, etc.) which may have accumulated on tread 5 and more particularly on surface 6 (i.e. illustrated as a pebble 8) may, as the tread 5 is rotated upwardly or downwardly about wheel 9, and due to the action of gravity, want to roll downwardly to remain on horizontal surface 6. However, an accumulation of such debris may eventually cause some or all debris to be expelled, or pushed out through a path means 45. Thus, it may be understood that in order to allow this evacuation of debris which may have accumulated on tread 5, it may be important that an opening of a constant i.e. substantially constant cross sectional area may be allowed to exist between adjacently disposed paddles 11, or at least between one pair of adjacently disposed paddles 11. Thus, as may be understood, the configuration of paddles 11 wherein a body 23 may be attached to tread 5 through the use of a narrow (i.e. narrower) pedestal 21, becomes important in order to allow any or all accumulated debris an escape route out between adjacent paddles 11. Thus as may be understood, path means 45 which due to the shape and geometry of paddles 11 may remains substantially constant, in order to allow for the evacuation of debris 8. As may be understood, the expression 'constant cross sectional area' or 'substantially constant cross sectional area' as applied to path means 45 may be understood to mean that the cross sectional area of path means 45 may remain constant or alternatively may become somewhat reduced as a result of the changing configuration of track 1, i.e. may, for illustration purposes, lose 5%, 10% or 15% of its cross sectional area, yet this (small) change may not impair, i.e. substantially impair the ability of the path means to evacuate debris. In other word, paddles 11 may be configured and disposed such that a slightly reduce cross sectional area thereof may still allow for the passage therethrough of debris, thus allowing accumulated debris to be evacuated, expelled etc. from the center portion of the track to the outside.

Figure 5:
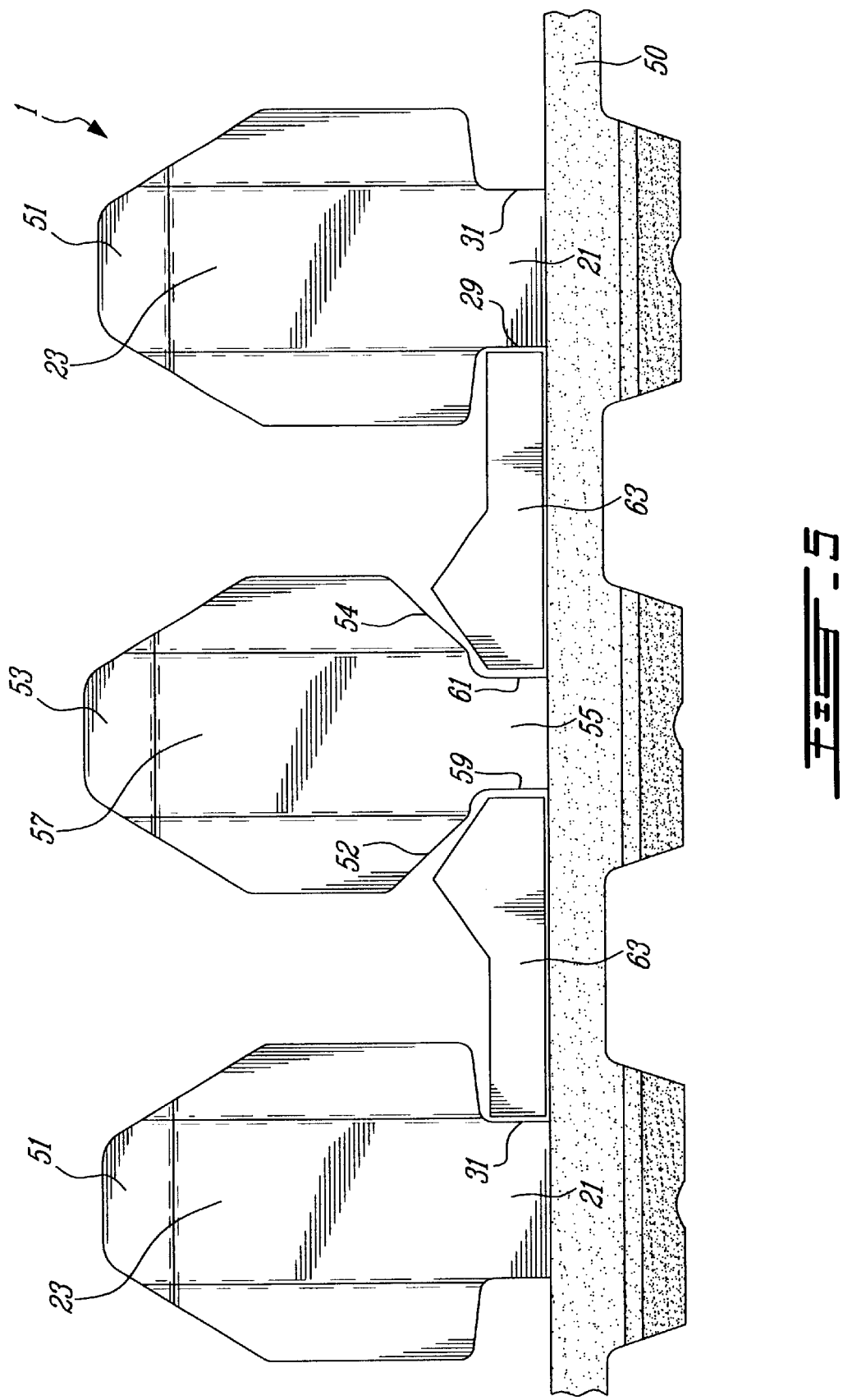
FIG. 5 illustrates an alternative embodiment of the track of FIG. 1.

Turning to FIG. 5, there is illustrated an alternative embodiment of track 1 wherein the configuration i.e. shape or geometry of the paddles 11 may be different or alternate from one tread 5 comprises paddles 51 and 53, paddle 51 to the next paddle 53. As illustrated in FIG. 5, paddles 51 may be substantially similar in configuration to paddles 11 illustrated in FIG. 2 to 4, however paddle 53 is shown as having lower surfaces 52 and 54 inclined at such an upward angle, so as to permit the creation of path means 63 which may be of a greater cross sectional area than the path means 45 as illustrated in FIG. 3 and 4. The paddle 53 has a body 57 and a pedestal 55 comprising lateral edges 59 and 61.

As may be understood, when paddles 51 and 53 are made to be rotated about wheels structures 7and 9 (as illustrated in FIG. 4), path means 63 may remain substantially of constant cross sectional area thus allowing an evacuation route for debris therethrough.

Figure 6:
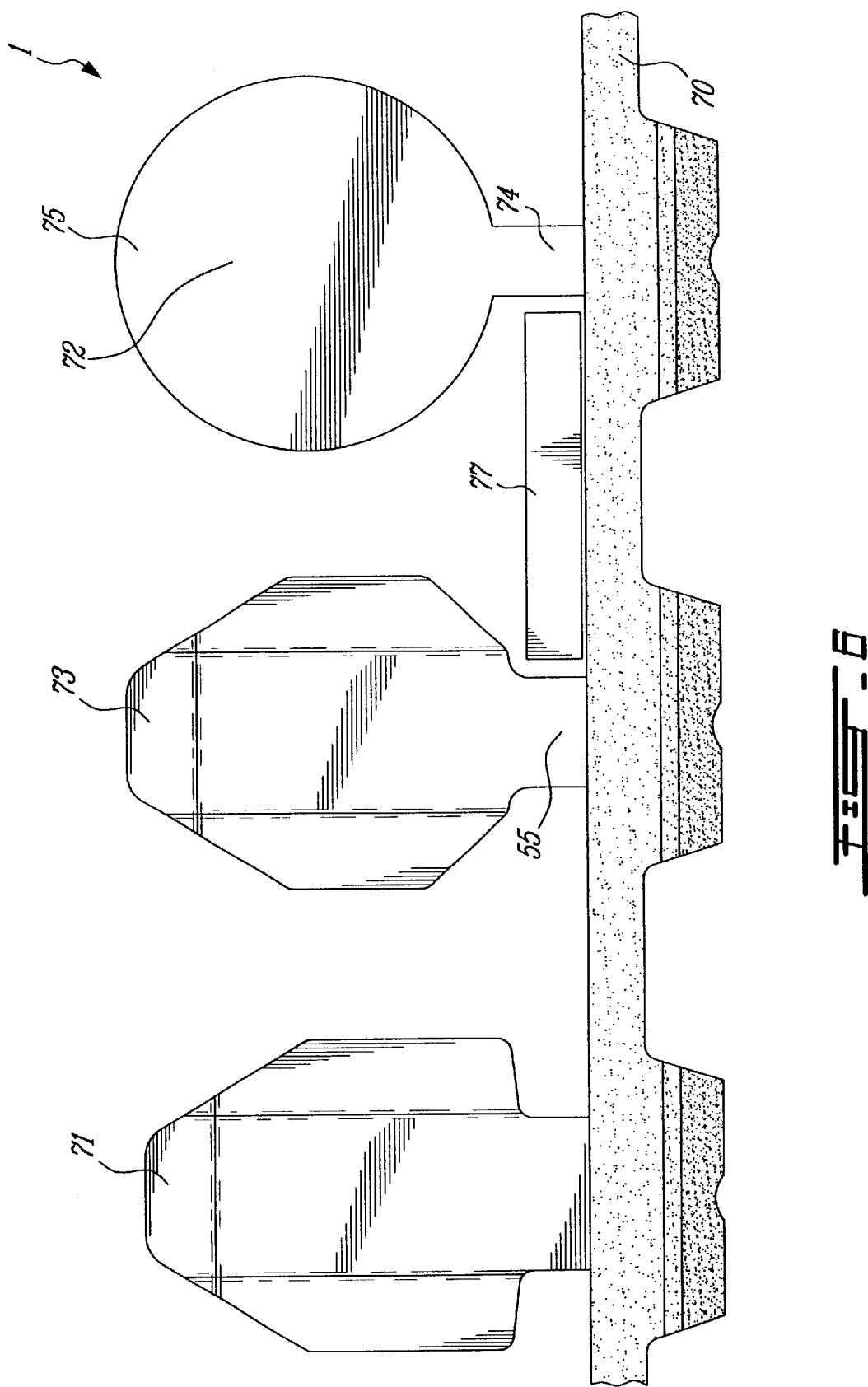
FIG. 6 is a further alternative embodiment of the track of FIG. 1.

FIG. 6 illustrates a further embodiment of track 1 as illustrated in FIGS. 1 through 4, wherein there is shown three different shaped paddles namely paddle 71 similar to paddles 11 of FIGS. 2 to 5, paddles 73 similar to paddles 53 of FIG. 6, and paddles 75 which is substantially of circular configuration. Further, as illustrated in the preceding figures a path means 77 may be created between adjacent paddles 73 and 75, thus allowing for the evacuation of debris therethrough. As may further be seen from FIG. 6, pedestal 74 of paddle 75 is narrower than pedestal 55 of paddle 73, thus creating a path means 77 which may be even greater than that shown in FIGS. 2 to 5. As may be understood, in accordance with a particular embodiment of the present invention, pedestal 74, (or pedestal 21 of paddle 11 as illustrated in FIG. 3) may be as narrow as possible, keeping in mind one of its intended objectives of connecting body 72 to track 70, and of providing some of the lateral rigidity necessary to keep the wheel structures 7 and 9 on the track 70. However, the narrower the pedestal 74, or the higher the body 72 to pedestal 74 ratio, the greater the path means 77, and, correspondingly, the greater the debris evacuation ability of track 70.

FIG. 7 illustrates an alternative embodiment of track 1 as shown in FIG. 1. FIG. 7 illustrates an embodiment wherein track 1 comprises a tread 80 having a plurality of pairs 82, 84, 86 of spaced apart paddles 81. The space apart paddles 81 are disposed along a longitudinal edge thereof of tread 80. Further, disposed between adjacent pairs 82–84, and adjacent pairs 84–85 there may be found a gap or opening. Further, as may be understood, tread 80 may comprise a second series of pairs 82, 84, 86 of spaced apart paddles 81 disposed similarly on the opposed second lateral edge of tread 80 (not shown).

As may further be seen from FIG. 7, pairs 82, 84, 86 of paddles 81 may be configured and disposed such that, in between spaced apart paddles 81 of each said pair, there may be disposed a path means 85 which may allow for the evacuation therethrough of debris, similar to that explained above with respect to FIGS. 2 to 6. Further, the spacing between the pairs 82, 84, 86 of paddles 81, may be similar, however it is understood that this spacing may be different from one pair 82 to the adjacent pair 84. In addition, FIG. 7 illustrates paddles 81 as being configured and disposed substantially similar one to another, but it is further understood that the paddles 81 may be configured and disposed to be different from one another, as illustrated in FIGS. 5 and 6.

FIG. 8 illustrates an additional embodiment of the present invention wherein track 1 is shown comprising a tread 90, a plurality of pairs 92, 95, 98 of spaced apart paddles 91. Disposed in between adjacent pairs 92, 95 and 98 there may be found further paddles 93 and 96, wherein paddles 93 and 96 are configured differently from paddles 91, namely in that paddles 93 and 96 are not configured with a body portion and a thinner (i.e. smaller) pedestal portion connecting the body portion to the tread 90. Thus as may be understood, in accordance with this embodiment even if track 1 comprises a number of more traditionally-shaped paddles, i.e. paddles 93 or 96, the presence of at least one pair (or, as illustrated, a plurality of pairs 92, 95, and 96) of spaced apart paddles 91 configured such that there may be a path means 94 disposed therebetween may provide for evacuation, or escape or outlet means for debris which may find its way within the inside of the track. As may be seen, for example, traditionally-shaped paddle 96 spaces apart pairs 95 and 98 of paddles 91. As may be understood, even when tread 90 bends about a wheel structure 9, the space between paddle 91 (of pair 95) and adjacent paddle 96 will shrink (or may even close off completely) and therefore preclude the evacuation of debris therebetween. However, even if this space is closed, the cross sectional area of path means 94 may remain substantially unchanged, and therefore path means 94 may still allow debris to be evacuated therethrough.

FIG. 9 is a top elevation view along view lines 9—9 of FIG. 4 and illustrates a piece of debris 8 on surface 6 of tread 5 of track 1. Further, FIG. 9 illustrates path means 45 which are illustrated as rectangular boxes, which rectangular boxes are shown comprising cross hatching for the sake of clarity only. Further, wheel structure 9 is shown on the right hand side of tread 5. Also illustrated in FIG. 9 is the interior volume of track 1, as indicated by reference number 200, and the exterior of the track 1 as indicated by reference numbers 201.

Motion arrow 100 illustrate the direction of movement of tread 5 i.e. for example the direction of relative motion of tread 5 vis-à-vis wheel structure 9. As may be understood, debris 8 which rests on surface 6 of tread 5 will also be imparted with relative movement vis-à-vis wheel structure 9 in the direction of motion arrow 100. Eventually, debris 8 will come against wheel structure 9 and will therefore abut against it. Depending on the size, strength and/or resistance of debris 8, wheel structure 9 may either crush it, roll over it or preferably, may cause it to be displaced away from it, for example in the direction of motion arrows 102, 104 or 106. This relative movement of the debris 8 away from wheel structure 9, and the presence of other pieces of debris, may impart lateral motion to debris 8. Eventually, debris 8 may be made to be displaced laterally, i.e. or somewhat laterally, and may eventually come to be displaced in the path means 45 to a location in between a pair of paddles 11. As may be understood, the path means 45 which may have a constant cross sectional area, allows for an escape outlet to the outside of the track, which may allow debris 8 to be evacuated between a pair of adjacent paddles 11 in the direction of motion arrow 108.

FIG. 10 is a perspective view of a portion of track 1 of FIG. 1, showing a segment of upper run 8 of tread 5. As illustrated, a plurality of paddles 11 project downwardly from tread 5, said paddles 11 being configured substantially similar one to the other and disposed at even spacings.

In addition, tread 5 is shown as having a pin 120 disposed therethrough, which pin 120 may be used to affix one extremity 121 to second extremity 122 of tread 5 in order to buckle the tread (5) together. As may be understood, FIG. 1 illustrates the attachment of a unitary, i.e. one piece, track, having opposed ends 121 and 122, which are connected together to close off the loop, in order to create the endless track 1. Pin 120 may be of standard construction.

FIG. 10 further illustrates a detail of projection 13 and depression 15 which may assist tread 5 in gripping the ground.

FIG. 11 shows a perspective view of a pair of paddles shown outside of track 1. In accordance with this particular embodiment of the present invention, the paddles which are disposed such that they project adjacent first lateral side 22 and second lateral side 24 (as illustrated in FIG. 9) may in fact be a unitary piece of metal 130, made of, for example, steel which has been cut, cast, or stamped, and then bent, into the shape as illustrated in FIG. 11. Thus as may be understood, a unitary piece 130 comprising two paddles 11 may ad rigidity and additional stability to track 1. Further, the presence of holes 131 may, improve the adherence of piece 130 to tread 5. Finally, width 132 of piece 130 may be as required or desired, and may for example be as wide as tread 5, or may conversely be narrower.

FIG. 12 is a cross sectional view along view lines 12—12 of FIG. 10 showing how piece 130 comprising paddles 11 and 11 is embedded inside tread 5 of track 1.

What is claimed is:

1. An endless rubber self cleaning track for use with a vehicle adapted for travel over rough terrain, said track being configured and disposed to be entrained by a drive wheel disposed on said vehicle, said track comprising:

opposed first and second lateral sides, an inward surface and an outward surface and at least one pair of spaced apart paddles projecting from said track adjacent said first lateral side, each of said paddles comprising a body portion and a pedestal, said pedestal connecting said body portion to said track, said body portion being wider than said pedestal, said pair of spaced apart paddles defining a boundary between an interior volume of said track and the exterior of said track wherein said body portion and said pedestal of each of said paddle are configured and disposed to form an outlet therebetween, said outlet allowing the interior volume of said track and the exterior of said track to be in constant communication with each other at all times, wherein said body portion and said pedestal of each of said paddle being further configured and disposed such that when said track is entrained by said drive wheel such that said spaced apart paddles are rotated towards each other, the cross sectional area of said outlet remains substantially constant.

2. The track of claim 1 wherein at least one pair of spaced apart paddles are disposed on said first lateral side and at least one pair of spaced apart paddles are disposed on said second lateral side of said track.

3. The track of claim 1 wherein the width of said pedestal is less than 50 percent of the width of said body portion.

4. The track of claim 1 wherein said track is of a unitary construction.

5. The track of claim 1 wherein said paddles project from said inward surface.

6. A self-cleaning flexible track for use with vehicles suitable for travel over rough terrain, said track being configured and disposed to be entrained by a drive wheel disposed on said vehicle, said track comprising opposed first and second lateral sides, an inward surface and an outward surface, said track comprising a plurality of spaced apart paddles projecting from said interior surface adjacent each of said first and second lateral sides, each of said paddles comprising a body portion and a pedestal, said pedestal connecting said body portion to said track, said body portion being wider than said pedestal, said plurality of spaced apart paddles defining a boundary between an interior volume of said track and the exterior of said track wherein said body portion and said pedestal of each of said paddles are configured and disposed to form an outlet therebetween, said outlet allowing said interior volume of said track and the exterior of said track to be in constant communication with each other, wherein said body portion and said pedestal of each of said paddles being further configured and disposed such that when said track is entrained by said drive wheel such that adjacent paddles are rotated towards each other, the cross sectional area of said outlet remains substantially constant.

7. The track of claim 6 wherein all of the paddles are configured identical to one another.

8. The track of claim 6 wherein said track is made of a reinforced rubber composition.

9. The track of claim 8 wherein the track comprises a unitary piece of rubber.

10. The track of claim 6 wherein said first lateral side and said second lateral side each comprise paddles spaced at regular intervals.

11. The track of claim 6 wherein the width of said pedestal is less than 50 percent of the width of said body portion.

\* \* \* \* \*